United States Patent
Randall

(10) Patent No.: US 7,725,452 B1
(45) Date of Patent: May 25, 2010

(54) SCHEDULER FOR SEARCH ENGINE CRAWLER

(75) Inventor: Keith H. Randall, Mountain View, CA (US)

(73) Assignee: Google Inc., Mountain View, CA (US)

( * ) Notice: Subject to any disclaimer, the term of this patent is extended or adjusted under 35 U.S.C. 154(b) by 524 days.

(21) Appl. No.: 10/853,627

(22) Filed: May 20, 2004

Related U.S. Application Data

(63) Continuation-in-part of application No. 10/614,113, filed on Jul. 3, 2003, now Pat. No. 7,308,643.

(51) Int. Cl.
G06F 7/00 (2006.01)
G06F 17/30 (2006.01)

(52) U.S. Cl. ................................. 707/709; 707/705

(58) Field of Classification Search ............... 707/2, 707/10, 104.1, 705, 709
See application file for complete search history.

(56) References Cited

U.S. PATENT DOCUMENTS

| | | | | |
|---|---|---|---|---|
| 5,898,836 | A * | 4/1999 | Freivald et al. ............. | 709/218 |
| 6,012,087 | A * | 1/2000 | Freivald et al. ............. | 709/218 |
| 6,219,818 | B1 * | 4/2001 | Freivald et al. ............. | 714/799 |
| 6,263,364 | B1 * | 7/2001 | Najork et al. ............... | 709/217 |
| 6,285,999 | B1 | 9/2001 | Page ........................... | 707/5 |
| 6,321,265 | B1 * | 11/2001 | Najork et al. ............... | 709/224 |
| 6,351,755 | B1 * | 2/2002 | Najork et al. ............... | 715/206 |
| 6,377,984 | B1 * | 4/2002 | Najork et al. ............... | 709/217 |
| 6,418,433 | B1 * | 7/2002 | Chakrabarti et al. .......... | 707/5 |
| 6,418,453 | B1 * | 7/2002 | Kraft et al. ................. | 707/200 |
| 6,424,966 | B1 * | 7/2002 | Meyerzon et al. ............. | 707/3 |
| 6,547,829 | B1 * | 4/2003 | Meyerzon et al. ......... | 715/501.1 |
| 6,594,662 | B1 * | 7/2003 | Sieffert et al. .................. | 707/10 |
| 6,631,369 | B1 * | 10/2003 | Meyerzon et al. ............. | 707/4 |
| 6,638,314 | B1 * | 10/2003 | Meyerzon et al. ............ | 715/513 |
| 6,701,350 | B1 * | 3/2004 | Mitchell ..................... | 709/217 |
| 6,751,612 | B1 * | 6/2004 | Schuetze et al. ............... | 707/4 |
| 6,952,730 | B1 * | 10/2005 | Najork et al. ............... | 709/225 |

(Continued)

FOREIGN PATENT DOCUMENTS

WO    WO 01/50320 A1 *    7/2001

(Continued)

OTHER PUBLICATIONS

Hirai, Jun, et al., "WebBase: A Repository of Web Pages", Computer Networks, vol. 33 Issues 1-6, Jun. 2000, pp. 277-293.*

(Continued)

Primary Examiner—Robert Stevens
(74) Attorney, Agent, or Firm—Morgan, Lewis & Bockius LLP

(57) ABSTRACT

A scheduler for a search engine crawler includes a history log containing document identifiers (e.g., URLs) corresponding to documents (e.g., web pages) on a network (e.g., Internet). The scheduler is configured to process each document identifier in a set of the document identifiers by determining a content change frequency of the document corresponding to the document identifier, determining a first score for the document identifier that is a function of the determined content change frequency of the corresponding document, comparing the first score against a threshold value, and scheduling the corresponding document for indexing based on the results of the comparison.

18 Claims, 6 Drawing Sheets

U.S. PATENT DOCUMENTS

| | | | |
|---|---|---|---|
| 7,080,073 B1 * | 7/2006 | Jiang et al. | 707/7 |
| 7,139,747 B1 * | 11/2006 | Najork | 707/3 |
| 7,171,619 B1 * | 1/2007 | Bianco | 715/526 |
| 7,299,219 B2 * | 11/2007 | Green et al. | 707/2 |
| 2002/0010682 A1 * | 1/2002 | Johnson | 705/59 |
| 2002/0052928 A1 * | 5/2002 | Stern et al. | 709/218 |
| 2002/0099602 A1 * | 7/2002 | Moskowitz et al. | 705/14 |
| 2002/0129062 A1 * | 9/2002 | Luparello | 707/513 |
| 2004/0044962 A1 * | 3/2004 | Green et al. | 715/513 |
| 2004/0225642 A1 * | 11/2004 | Squillante et al. | 707/3 |
| 2004/0225644 A1 * | 11/2004 | Squillante et al. | 707/3 |
| 2005/0086206 A1 * | 4/2005 | Balasubramanian et al. | 707/3 |
| 2006/0277175 A1 * | 12/2006 | Jiang et al. | 707/5 |

FOREIGN PATENT DOCUMENTS

WO     WO 01/86507 A1 * 11/2001

OTHER PUBLICATIONS

Douglis, Fred, et al., "The AT&T Internet Difference Engine: Tracking and Viewing Changes on the Web", World Wide Web, vol. 1, No. 1, Mar. 1998, pp. 27-44.*

Arasu, Arvind, et al., "Searching the Web", ACM Transactions on Internet Technology, vol. 1, No. 1, Aug. 2001, pp. 2-43.*

Douglis, Fred, et al., "Rate of Change and Other Metrics: A Live Study of the World Wide Web", USENIX Symposium on Internetworking Technologies and Systems, Monterey, CA, Dec. 1997, pp. i and 1-13.*

Brandman, Onn, et al., "Crawler-Friendly Web Servers", ACM SIGMETRICS Performance Evaluation Review, vol. 28, issue 2, Sep. 2000, pp. 9-14.*

Cho, Junghoo, et al., "Efficient Crawling Through URL Ordering", Computer Networks and ISDN Systems, vol. 30, Issues 1-7, Apr. 1998, pp. 161-172.*

Brandman, Ono, et al., "Crawler-Friendly Web Servers", ACM SIGMETRICS Performance Evaluation Review, vol. 28, Issue 2, Sep. 2000, pp. 9-14.*

Cho, Junghoo, "Crawling the Web: Discovery and Maintenance of Large-Scale Web Data", PhD Thesis, Dept. of Computer Science, Stanford University, © 2001, 188 pages.*

Lee, Joseph K. W., et al., "Intelligent Agents for Matching Information Providers and Consumers on the World-Wide-Web", Proc. of the 13th Annual Hawaii International Conf. on System Sciences, © 1997, 11 pages.*

Cho, Junghoo, et al., "The Evolution of the Web and Implications for an Incremental Crawler", Proc. of the 26th VLDB Conf., Cairo, Egypt, © 2000, pp. 200-209.*

Cho, Junghoo, et al., "Synchronizing a Database to Improve Freshness", MOD 2000, Dallas, TX, Jun. 2000, pp. 117-128.*

Introna, Lucas, et al., "Defining the web: The Politics of Search Engines", Computer, vol. 33, Issue 1, Jan. 2000, pp. 54-62.*

Coffman, Jr., E. G., et al., "Optimal Robot Scheduling", Tech. Rep. RR-3317, © 1997, 19 pages, downloaded from: citeseer.ist.psu.edu/coffman97optimal.html.*

Klemm, Reinhard P., "WebCompanion: A Friendly Client-Side web Prefetching Agent", IEEE Transactions on Knowledge and Data Engineering, vol. 11, No. 4, Jul./Aug. 1999, pp. 577-594.*

Pandey, Sandeep, et al., "Monitoring the Dynamic Web to Respond to Continuous Queries", WWW 2003, Budapest, Hungary, May 20-24, 2003, pp. 659-668.*

Wolf, J. L., et al., "Optimal Crawling Strategies for Web Search Engines", WWW 2002, Honolulu, HI, May 7-11, 2002, pp. 136-147.*

Ali, Halil, et al., "What's Changed? Measuring Document Change in Web Crawling for Search Engines", SPIRE 2003, Manaus, Brazil, Oct. 8-10, 2003, pp. 28-42.*

Suel, Torsten, et al., "ODISSEA: A Peer-to-Peer Architecture for Scalable Web Search and Information Retrieval", WebDB, San Diego, CA, Jun. 12-13, 2003, pp. 1-6.*

Baeza-Yates, Ricardo, et al., "Balancing Volume, Quality and Freshness in web Crawling", Soft Computing Systems—Design, Management and Applications, © 2002, pp. 1-10.*

Shkapenyuk, Vladislav, et al., "Design and Implementation of a High-Performance Web Crawler", ICDE '02, San Jose, CA, Feb. 26-Mar. 1, 2002, pp. 357-368.*

Henzinger, Monika, "Web Information Retrieval—An Algorithmic Perspective", ESA 2000, LNCS 1879, Springer-Verlag, Berlin, Germany, © 2000, pp. 1-8.*

Bullot, Hadrien, et al., "A Data-Mining Approach for Optimizing Performance of an Incremental Crawler", WI '03, Oct. 13-17, 2003, pp. 610-615.*

Fetterly, Dennis, et al., "A Large-Scale Study of the Evolution of Web Pages", WWW 2003, Budapest, Hungary, May 20-24, 2003, pp. 669-678.*

Heydon, Allan, et al., "Mercator: A Scalable, Extensible Web Crawler", World Wide Web, vol. 2, No. 4, Springer, Netherlands, Dec. 1999, pp. 219-229.*

Brin, S., et al., "The Anatomy of a Large-Scale Hypertextual Web Search Engine," In Proc. of the 7th Int'l World Wide Web Conf., 1998.

Haveliwala, T.H., "Topic-Sensitive PageRank," In Proc. of the 11th Int'l World Wide Web Conf., May 2002.

Jeh, G., et al., "Scaling Personalized Web Search," In Proc. of the 12th Int'l World Wide Web Conf., 2003.

Kamvar, S.D., et al., "Exploiting the Block Structure of the Web for Computing PageRank," Stanford Univ. Technical Report, 2003.

* cited by examiner

SCHEDULER FOR SEARCH ENGINE CRAWLER

RELATED APPLICATIONS

This application is a continuation-in-part of U.S. patent application Ser. No. 10/614,113, filed Jul. 3, 2003, and patented as U.S. Pat. No. 7,308,643, which application is incorporated by reference herein in its entirety.

TECHNICAL FIELD

The present invention relates generally to search engine crawlers for use in computer network systems, and in particular to a scheduler for a search engine crawler.

BACKGROUND

A search engine is a software program designed to help a user access files stored on a computer, for example on the World Wide Web (WWW), by allowing the user to ask for documents meeting certain criteria (e.g., those containing a given word, a set of words, or a phrase) and retrieving files that match those criteria. Web search engines work by storing information about a large number of web pages (hereinafter also referred to as "pages" or "documents"), which they retrieve from the WWW. These documents are retrieved by a web crawler or spider, which is an automated web browser which follows every link it encounters in a crawled document. The contents of each document are indexed, thereby adding data concerning the words or terms in the document to an index database for use in responding to queries. Some search engines, also store all or part of the document itself, in addition to the index entries. When a user makes a search query having one or more terms, the search engine searches the index for documents that satisfy the query, and provides a listing of matching documents, typically including for each listed document the URL, the title of the document, and in some search engines a portion of document's text deemed relevant to the query.

While web pages can be manually selected for crawling, such manual assignment becomes impracticable as the number of web pages grows. Moreover, to keep within the capacity limits of the crawler, web pages should be added or removed from crawl cycles to ensure acceptable crawler performance. For instance, as of the end of 2003, the WWW is believed to include well in excess of 10 billion distinct documents or web pages, while a search engine may have a crawling capacity that is less than half as many documents.

Therefore, what is needed is a system and method of automatically selecting and scheduling documents for crawling based on one or more selection criteria. Such a system and method should be able to assess the stature (e.g., page rank) of a web page and schedule the web page for crawling as appropriate based on its stature.

SUMMARY

A scheduler for a search engine crawler includes a history log containing document identifiers (e.g., URLs) corresponding to documents (e.g., web pages) on a network (e.g., Internet). The scheduler is configured to process each document identifier in a set of the document identifiers by determining a content change frequency of the document corresponding to the document identifier, determining a first score for the document identifier that is a function of the determined content change frequency of the corresponding document, comparing the first score against a threshold value, and scheduling the corresponding document for indexing based on the results of the comparison. The threshold value can be computed from an initial sampling of document identifiers. One or more factors can be used to compute a score, including page rank, crawl history and the like.

A method of scheduling documents to be downloaded by a search engine crawler includes retrieving a number of document identifiers, each document identifier identifying a corresponding document on a network. For each retrieved document identifier, the method determines a content change frequency of the corresponding document and determines a first score for the document identifier that is a function of the determined content change frequency of the corresponding document. It then compares the first score against a threshold value, and schedules the document for indexing based on the result of the comparison.

A computer-readable medium has stored thereon instructions which, when executed by a processor, cause the processor to perform the operations of the method described above.

DESCRIPTION OF EMBODIMENTS

Overview of Crawler System

Figure 1:
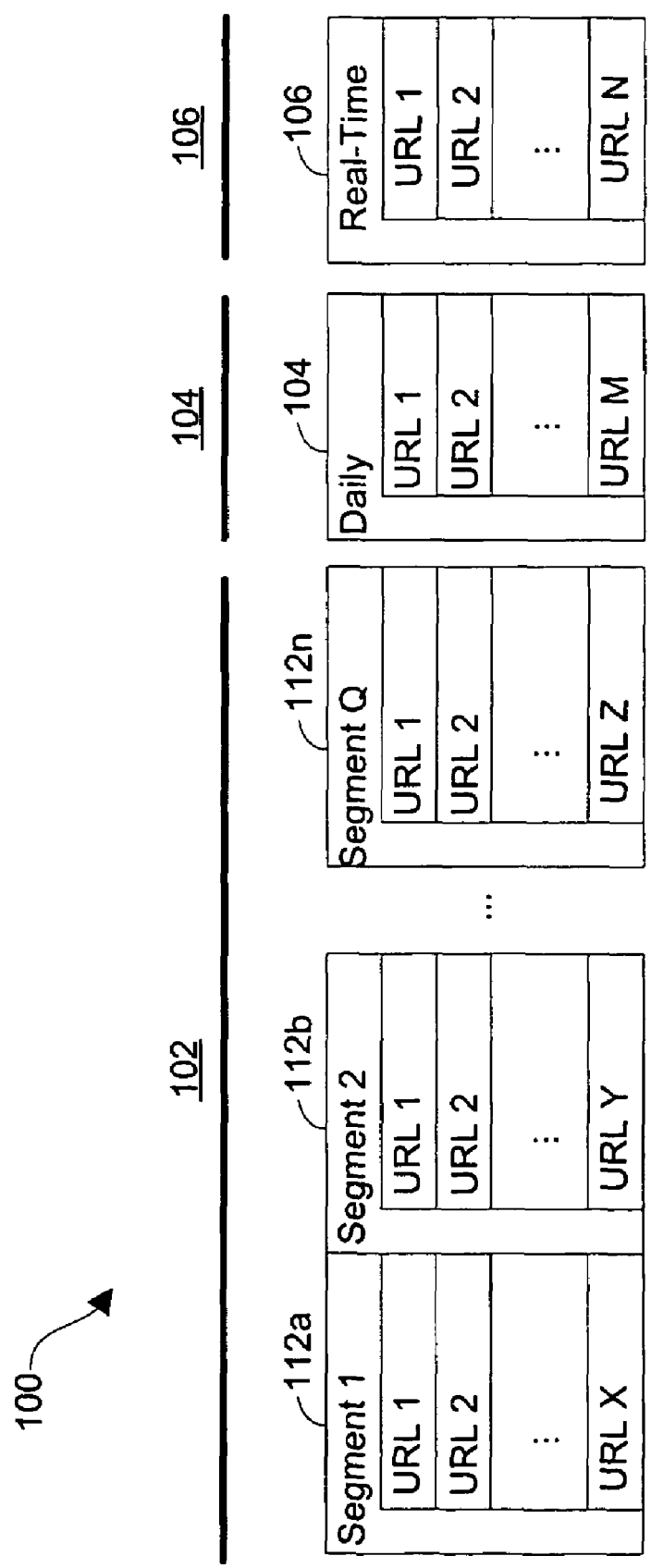
FIG. 1 illustrates a data structure for storing URLs, in accordance with some embodiments of the present invention.

FIG. 1 illustrates a data structure 100 for storing document identifiers (e.g., web page URLs) in segments, in accordance with some embodiments of the present invention. In some embodiments, the data structure 100 includes a base layer 102, a daily crawl layer 104 and an optional real-time layer 106. The base layer 102 comprises a sequence of segments 112a, ..., 112n, wherein each segment 112 includes a number of URLs representing a percentage of the web page address space that has been (or will be) used by a web crawler system. Some embodiments do not include a daily crawl layer 104 or a real-time layer 106.

The daily crawl layer 104 comprises URLs to be crawled more frequently than the URLs in segments 112. In addition, daily crawl layer 104 includes high priority URLs that are discovered by the web crawler system during a current epoch. An epoch is a predetermined time period (e.g., a day).

The real-time layer 106 includes URLs to be crawled multiple times during a given epoch (e.g., multiple times per day). For example, the URLs in the real-time layer 106 are crawled every few minutes, or N times per hour (where N is a value greater than or equal to 1). The real-time layer 106 can also include newly discovered URLs that have not been crawled but should be crawled as soon as possible.

Figure 2:
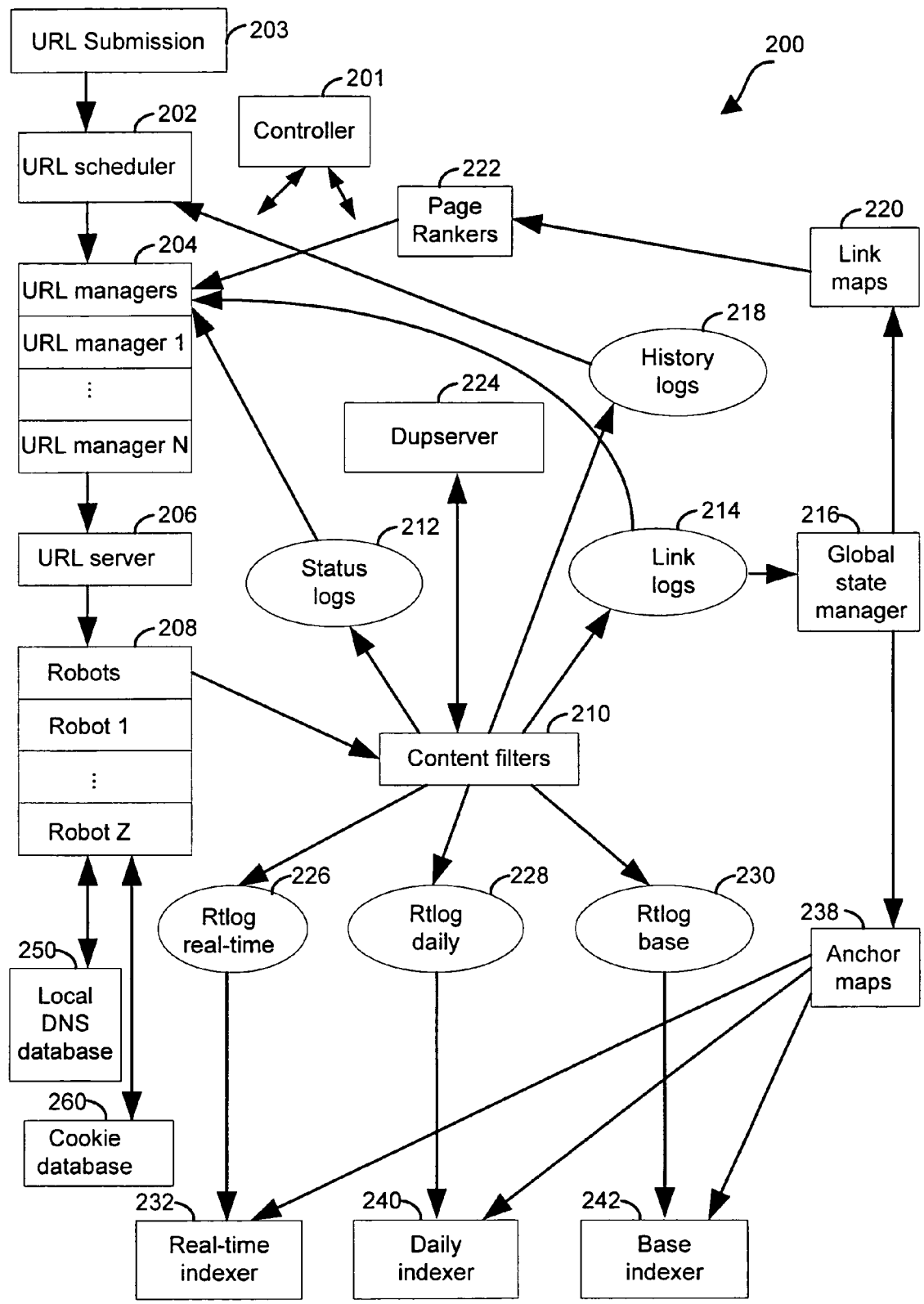
FIG. 2 illustrates a web crawler system for processing crawled web pages, in accordance with some embodiments of the present invention.

FIG. 2 is a block diagram of a web crawler system 200, which crawls URLs stored in the data structure 100, in accordance with some embodiments of the present invention. There are a number of different URL sources used to populate the data structure 100, including direct submission 203 of URLs by users of the search engine system 200, or submissions 203 (e.g., time-based submissions) from third parties who have agreed to provide links as they are published, updated or changed. Another source of URLs is through discovery of outgoing links on crawled pages.

The URL scheduler 202 determines which URLs will be crawled in each epoch, and stores that information in the data structure 100. The controller 201 selects a segment 112 from the base layer 102 for crawling. The selected segment 112 is referred to hereinafter as the "active segment." Typically, at the start of each epoch, the controller 201 selects a different segment 112 from the base layer 102 as the active segment so that, over the course of several epochs, all the segments 112a, ..., n are selected for crawling in a round-robin manner. The URL scheduler 202 revises the daily crawl layer 104 and/or the real-time layer 106 by moving URLs to the layers 104 and/or 106 from the base layer 102 or vice versa. Alternately, in some embodiments URLs are scheduled to the daily and real-time layers 104, 106 without regard to their absence or inclusion in the base layer 102. When a document appears in document indexes generated by both the daily and base crawl layers, for instance, the front end of the search engine provides a mechanism for using the most recent version of the document when responding to queries.

A query-independent score (also called a document score) is computed for each URL by URL page rankers 222. The page rankers 222 compute a page rank for a given URL by considering not only the number of URLs that reference a given URL but also the page rank of such referencing URLs. Page rank data is provided to URL managers 204, which pass a page rank value for each URL to URL server 206, robots 208, content filters 210, and other servers in the system 200. An explanation of the computation of page rank is found in U.S. Pat. No. 6,285,999, which is incorporated by reference herein in its entirety.

From time to time, the URL server 206 requests URLs from the URL managers 204. In response, the URL managers 204 provide the URL server 206 with URLs obtained from data structure 100. The URL server 206 then distributes URLs from the URL managers 204 to crawlers 208 (hereinafter also called "robots" or "bots") to be crawled. A robot 208 is a server that retrieves documents at the URLs provided by the URL server 206. The robots 208 use various known protocols to download pages associated with URLs (e.g., HTTP, HTTPS, gopher, FTP, etc.).

In embodiments where the robots 208 use a calling process that requires domain name system (DNS) resolution, a dedicated local DNS database 250 (FIG. 2) can be used to store IP addresses for URLs that have been crawled in the past. This feature allows previously crawled URLs to be pre-resolved with respect to DNS resolution, thus enabling a high percentage of the system's DNS resolution operations to be handled locally at high speed.

To address the handling of URLs that use or are regulated by cookies, a cookie database 260 can be included in system 200 for providing stable storage for cookies sent to robots 208 by cookie servers (not shown) on the Internet. The cookie database 260 is structured so that cookie servers can update the status of cookies upon request. The ability to access cookies acquired by robots 208 on previous crawls provides a number of possible advantages to subsequent robot 208 queries, such as speeding up the login process to the URL on the second crawl, gaining access to preferred web content, and possibly regulating which content is accessed from the URL. Further, the use of the cookie database 260 enables robots 208 to crawl content that is regulated by cookie servers.

Pages obtained from URLs that have been crawled by robots 208 are delivered to the content filters 210. In typical embodiments, there is more than one content filter 210 in system 200 because of the computational demands of the content filter 210. Alternatively, the content filter 210 can be implemented as part of each robot 208. Each content filter 210 sends the retrieved web pages to Dupserver 224 to determine if they are duplicates of other web pages using, for example, techniques described in co-pending U.S. patent application Ser. No. 10/614,111, filed Jul. 3, 2003, which is hereby incorporated by reference as background information.

In some embodiments, the content filters 210 write out four or more types of log files, including link logs 214, RTlogs 226, 228, and 230, history logs 218, and status logs 212. The link log 214 contains one link record per URL document. A URL document is a document obtained from a URL by a robot 208 and passed to a content filter 210. Each link log 214 record comprises all the links (e.g., URLs, also called outbound links) that are found in the URL document associated with the record and the text that surrounds the link. The log records in an RTlog include the full content of the documents obtained by robots 208. Each document is coupled with a score (e.g., page rank) that was assigned to the source URL of the document by the page rankers 222.

Indexers 232, 240 and 242 obtain documents from the RTlogs 226, 228 and 230, on a high throughput basis and make these documents searchable by a front-end querying system (not shown). Global state manager 216 reads link logs 214 and uses the information in the link logs to create link maps 220. The records in the link map 220 are similar to records in the link log 214 with the exception that text is stripped and the records are keyed by a "fingerprint" of the normalized value of the source URL. In some embodiments, a URL fingerprint is a 64-bit integer determined by applying a hash function or other one way function to a URL. The bit-length of the URL fingerprint may be longer or shorter than 64 bits in other embodiments. The records in each link map 220 may optionally be sorted or keyed by a fingerprint. The link maps 220 are used by the page rankers 222 to adjust the page rank of URLs within data structure 100. Preferably, such page rankings persist between epochs.

In addition to creating the link maps 220, the global state manager 216 creates anchor maps 238. In contrast to records in a link map 220, records in an anchor map 238 are keyed (i.e., indexed) by the URL fingerprints of outbound URLs present in the link log 214. The records in each anchor map 238 may optionally be sorted by outbound URL fingerprints as well as being keyed by outbound URL fingerprints. Thus, each record in an anchor map 238 comprises a fingerprint of an outbound URL and text that corresponds to the URL in the link log 214. The anchor maps 238 are used by indexers 232, 240 and 242 to facilitate the indexing of "anchor text" as well as to facilitate the indexing of URLs that do not contain words. The indexing of anchor text is described more fully in U.S. patent application Ser. No. 10/614,113, filed Jul. 3, 2003.

URL Scheduling

In some embodiments, the URL scheduler 202 determines whether to add or remove URLs from the daily layer 104 and the real-time layer 106 based on information stored in records in the history logs 218. The history log records include information indicating how frequently the content associated with the URLs is changing (hereinafter also referred to as "URL change frequency" or "content change frequency") and individual URL page ranks set by the page rankers 222. Note that the history logs 218 also contain log records for URLs that are not found in data structure 100. For instance, the history log 218 can contain log records for URLs that no longer exist and/or log records for URLs that exist but are no longer scheduled for crawling (e.g., due to a request by the website owner that the URL not be crawled, due to objectionable content, or for any other reasons).

History Log

Figure 3:
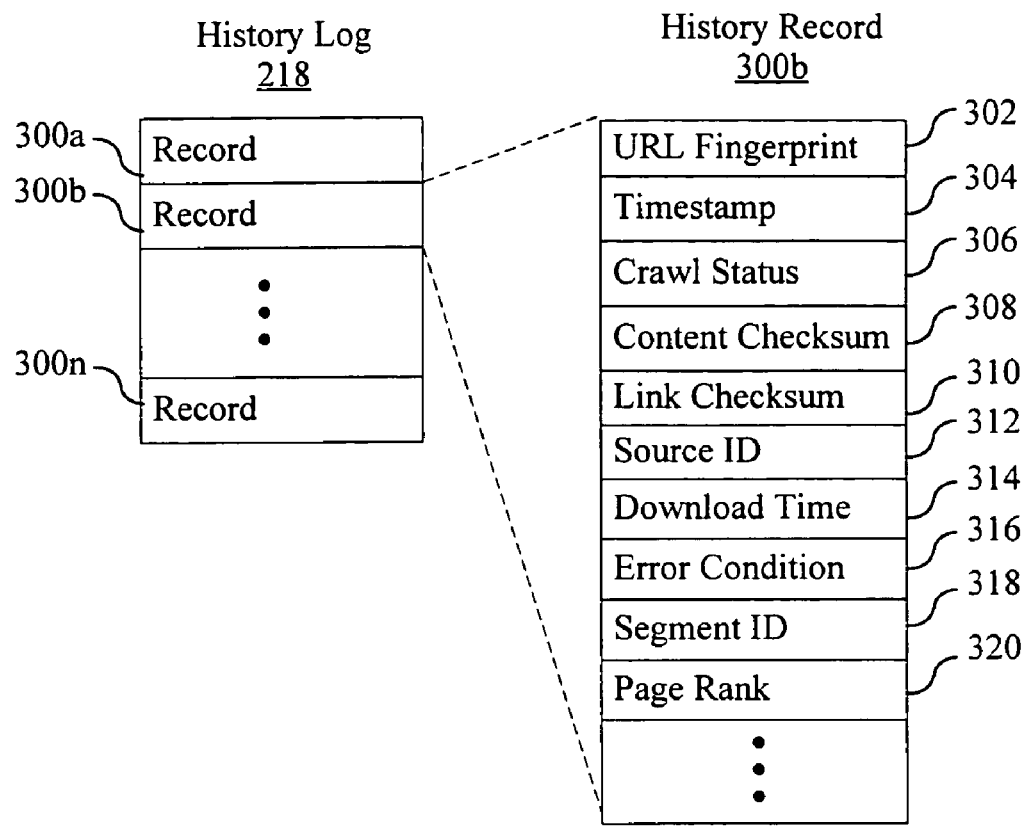
FIG. 3 is illustrates a history log generated by the system shown in FIG. 2, in accordance with some embodiments of the present invention.

FIG. 3 illustrates a history log 218, in accordance with some embodiments of the present invention. The history log 218 includes a record 300 for each URL that has been crawled by the robot 208. In some embodiments, each record includes a URL Fingerprint (URL FP) 302, a Timestamp 304, a Crawl Status 306, a Content Checksum 308, a Link Checksum 310, a Source ID 312, a Download Time 314, an Error Condition 316, a Segment ID 318 and a Page Rank 320. Note that this is not an exhaustive list of possible fields for records 300, and records 300 can include more or less data fields as appropriate.

The URL fingerprint 302 is, for example, an N-bit number (where N is a value or a bit length) that is generated from the corresponding URL by first normalizing the URL text (e.g., converting host names to lower case) and then passing the normalized URL through a fingerprinting function that is similar to a hash function except the fingerprint function guarantees that the fingerprints are well distributed across the entire space of possible numbers. In some embodiments, the fingerprint modulus S, where S is the number of segments 112 in base layer 102 (e.g., "fingerprint modulus 12", in the case where there are 12 segments 112 in base layer 102) is used to select the segment 112 in which to place a given URL. In some embodiments, additional rules are used to partition URLs into a segment 112 of base layer 102, the daily crawl layer 104 and/or the real-time layer 106.

The TimeStamp 304 indicates the time the record 300 was recorded. The Crawl Status 306 indicates whether the corresponding URL 302 was successfully crawled (i.e., whether the particular download attempt documented by this history log record 300 was successful). The Content Checksum 308 (also called the content fingerprint) is a numerical value corresponding to the content of the downloaded document, if the download was successful. In some embodiments, this checksum value 308 is generated by computing a predefined checksum on the contents of the downloaded document. The Content Checksum 308 can be used to determine whether the content of a web page has changed. When web pages have identical content, they will also have the same Content Checksum 308. The URL scheduler 202 can compare these content fingerprints 308 with previous content fingerprints obtained for the corresponding URL (e.g., identified by URL FP 302 in the history log record 300) on a previous crawl to ascertain whether the web page has changed since the last crawl.

Similarly, the Link Checksum 310 is a numerical value corresponding to the values of all the outbound links on the web page associated the URL 302. In some embodiments, the Link Checksum 310 is generated by computing a predefined checksum on the output links of the downloaded document. In some embodiments, the URL scheduler 202 is configured to use the Link Checksum 310 to determine whether any of the outbound links on the web page associated with the corresponding URL 302 have changed since the last crawl. For example, the URL schedule 202 may be configured to compare the Link Checksum 310 of the downloaded document with the Link Checksum 310 for the most recent prior download of the same URL to see if they are equal. If they are not equal, a change has occurred in the set of outbound links in the document (e.g., at least one outbound link has been added, removed or changed in value).

The Source ID 312 provides an indication of whether the robot 208 accessed the URL 302 using the Internet (which can be considered to be a first database of documents) or an internal repository of documents (which can be considered to be a second database of documents).

The Download Time 314 provides an indication of how long it took a robot 208 to download the web page associated with the corresponding URL FP 302.

The Error Condition 316 records any errors that were encountered by a robot 208 when attempting to download the web page associated with the URL FP 302. An example of an error is "HTTP4," which indicates that the web page does not exist. Other, distinct error types may be used to indicate if an existing web page is unavailable or unreachable.

The Segment ID 318 identifies the particular crawl segment 112a, . . . , 112n (FIG. 1) associated with the URL FP 302 at the time that the document download operation represented by this record 300 was performed or attempted.

Page Rank 320 includes the page rank assigned to the URL FP 302 at the time that the document download operation represented by this record was performed or attempted. The page rank of a URL may change over time, as the set of pages having links to the page corresponding to URL FP 302 changes, and as the page ranks of these referring pages change. The Page Rank 320 included in any particular record for a URL FP 302 represents a snapshot of the corresponding URL's page rank at the time represented by the timestamp 304.

Scoring Functions

In some embodiments, the determination as to what URLs are placed in daily crawl layer 104 and/or real-time layer 106 (as opposed to base layer 102) is determined by computing a Daily Score, which is a composite score of the form:

$$\text{Daily Score} = F1(\text{page rank}, \text{change frequency}, \text{age}) \quad \text{(Eq. 1A)}$$

where F1 is a function of a specified document's page rank, change frequency and age, or a subset of those parameters. For instance in one embodiment, $$\text{Daily Score} = (\text{page rank})^2 * \text{URL change frequency} \quad \text{(Eq. 1B)}$$

The mechanism by which URL scheduler 202 obtains URL change frequency data is best understood by reviewing FIG. 2. When a URL is accessed by a robot 208, the information is passed through content filters 210. Content filters 210, among other things, determine whether a URL has changed (e.g., by checking Content Checksum 308) and when a URL was last accessed by a robot 208. This information is placed in the history logs 218, which are passed back to the URL scheduler 202. By reviewing the log records for a particular URL, each of which indicates whether the content of a URL changed since the immediately previous time the URL was crawled, the URL schedule 202 (or other module) can compute a URL change frequency. This technique is particularly useful for identifying URL's having content (i.e., the content of the page at the URL) that changes infrequently, or perhaps not at all. Further, the computation of a URL change frequency can include supplemental information about the URL. For instance, the URL scheduler 202 can maintain or access information about web sites (i.e., URLs) whose content is known to change quickly.

In cases where the URL scheduler 202 determines that a URL should be placed in a segment 112 of base layer 102, the placement of the URL into a given segment 112a, . . . , 112n of base layer 102 is random (or pseudo-random), so that the URLs to be crawled are evenly distributed (or approximately evenly distributed) over the segments 112a, . . . 112n. In some embodiments, a mathematical function (e.g., a modulo function) is applied to the URL FP to achieve the random selection of a segment 112a, . . . 112n in which to place the URL.

In some embodiments, it is not possible to crawl all the URLs in an active segment 112, daily crawl layer 104 and/or real-time layer 106 during a given epoch. In some embodiments, this problem is addressed using two different approaches. In a first approach, a Crawl Score is computed for each URL in an active segment 112, the daily layer 104 and/or the real-time layer 106. Only those URLs that receive a high Crawl Score (e.g., above a threshold value) are passed on to the next stage (URL managers 204) for downloading. In a second approach, URL scheduler 202 determines an optimum crawl frequency for each such URL and passes the crawl frequency information on to the URL managers 204. The crawl frequency information is then ultimately used by URL managers 204 to decide which URLs to crawl. These two approaches are not mutually exclusive and a combined methodology for prioritizing the URLs to crawl (based on both the Crawl Score and the optimum crawl frequency) may be used.

In embodiments where a Crawl Score is computed, the URL scheduler 202 determines which URLs will be crawled (downloaded from the Internet) during the epoch by computing a Crawl Score (or referencing a previously computed Crawl Score) for each URL. Those URLs that receive a high Crawl Score (e.g., above a predefined threshold) are passed on to the next stage (URL managers 204), whereas those URLs that receive a low Crawl Score (e.g., below the predefined threshold) are not passed on to the next stage during the given epoch. There are many different factors that can be used to compute a Crawl Score including the current location of the URL (active segment 112, daily crawl segment 104 or real-time segment 106), page rank, and crawl history. The crawl history can be obtained from the history logs 218.

Although many possible Crawl Scores are possible, in some embodiments the Crawl Score is a composite score computed as follows:

$$\text{Crawl Score}=F2(\text{page rank},\text{change frequency},\text{age}) \quad \text{(Eq. 2A)}$$

where F2 is a function of a specified document's page rank, change frequency and age, or a subset of those parameters. In some embodiments, a document's age is defined as the time since the last download of the document by a web crawler. In other embodiments, the age of a document (u) is defined as:

$$\text{Age}(u)=\text{Now}-(\text{last\_crawl}(u)+\text{expected\_shelf life}(u)) \quad \text{(Eq. 2B)}$$

where the expected_shelf_life(u) of a document (u) is based on an expiration time provided by the document's source, or based on other information (e.g., rates of change) known about the document or other documents from the same source, or based on such information known about other documents considered to be similar to document (u). Such information may be statistical information about the rates of change of a set of documents, and such information maybe distilled, using various statistical or mathematical techniques, to produce an "expected shelf life" value for a particular document. In one embodiment:

$$\text{Crawl Score}=(\text{page rank})^2*(\text{URL change frequency})* \\ (\text{time since last crawl of URL}). \quad \text{(Eq. 2C)}$$

In another embodiment, $$\text{Crawl Score}=(\text{page rank})*(\text{URL change frequency})* \\ (\text{time since last crawl of URL}). \quad \text{(Eq. 2D)}$$

In yet another embodiment, $$\text{Crawl Score}=(\text{page rank})^2*(\text{age}) \quad \text{(Eq. 2E)}$$

where the age of document (u) may be defined or computed using any of a variety of techniques, as mentioned above. In this last embodiment, information about a document's content change frequency may be incorporated into (or otherwise taken into account in) the "age" parameter of the Crawl Score function.

Additionally, many modifications to the Crawl Score, including modifications using cutoffs and weights are possible. For example, the Crawl Score of URLs that have not been crawled in a relatively long period of time can be weighted so that the minimum refresh time for a URL is a predetermined period of time (e.g., two months). In some embodiments, the URL change frequency is computed using the Content Checksum 308 stored in the history log 218. In some embodiments, the Content Checksum 308 is generated by applying the 32-bit Ethernet CRC to the content of the document at the URL, while in other embodiments other checksum functions are used. If the document at a URL is altered, the Content Checksum 308 will have a different value. The "time since last crawl" variable can be computed from the TimeStamp 304 and the current system time derived from a master system clock or the like.

In embodiments where crawl frequency is used, the URL scheduler 202 sets and refines a URL crawl frequency for each URL in the data structure 100. The URL crawl frequency for a given URL represents the optimum crawl frequency (or, more generally, a selected or computed crawl frequency) for a URL. The crawl frequency for URLs in the daily crawl layer 104 and the real-time layer 106 will tend to be higher than the crawl frequency for URLs in the base layer 102. The crawl frequency for any given URL can range from high values (e.g., representing crawl repeat rates of multiple times per hour) to low values (e.g., representing crawl repeat rates of less than once per month). In some embodiments, the optimal crawl frequency for a URL is computed based on the historical change frequency of the URL and the page rank of the URL.

In addition to other responsibilities, the URL scheduler 202 determines which URLs are deleted from the data structure 100 and therefore dropped from the system 200. The URLs are removed from the data structure 100 to make room for new URLs to be added to the data structure 100. In some embodiments, a Keep Score is computed for each URL in data structure 100. The URLs are then sorted by the Keep Score and the URLs that receive a low Keep Score are eliminated as newly discovered URLs are added to the data structure 100. In some embodiments, the Keep Score for a document (u) is set equal:

$$\text{Keep Score}=F3(\text{page rank},\text{change frequency},\text{age}) \quad \text{(Eq. 3A)}$$

where F3 is a function of a specified document's page rank, change frequency and age, or a subset of those parameters. In one embodiment, the Keep Score for a document (u) is set equal to the page rank of the document, as determined by the page rankers 222 (FIG. 2).

URL Scheduler Computer System

Figure 4:
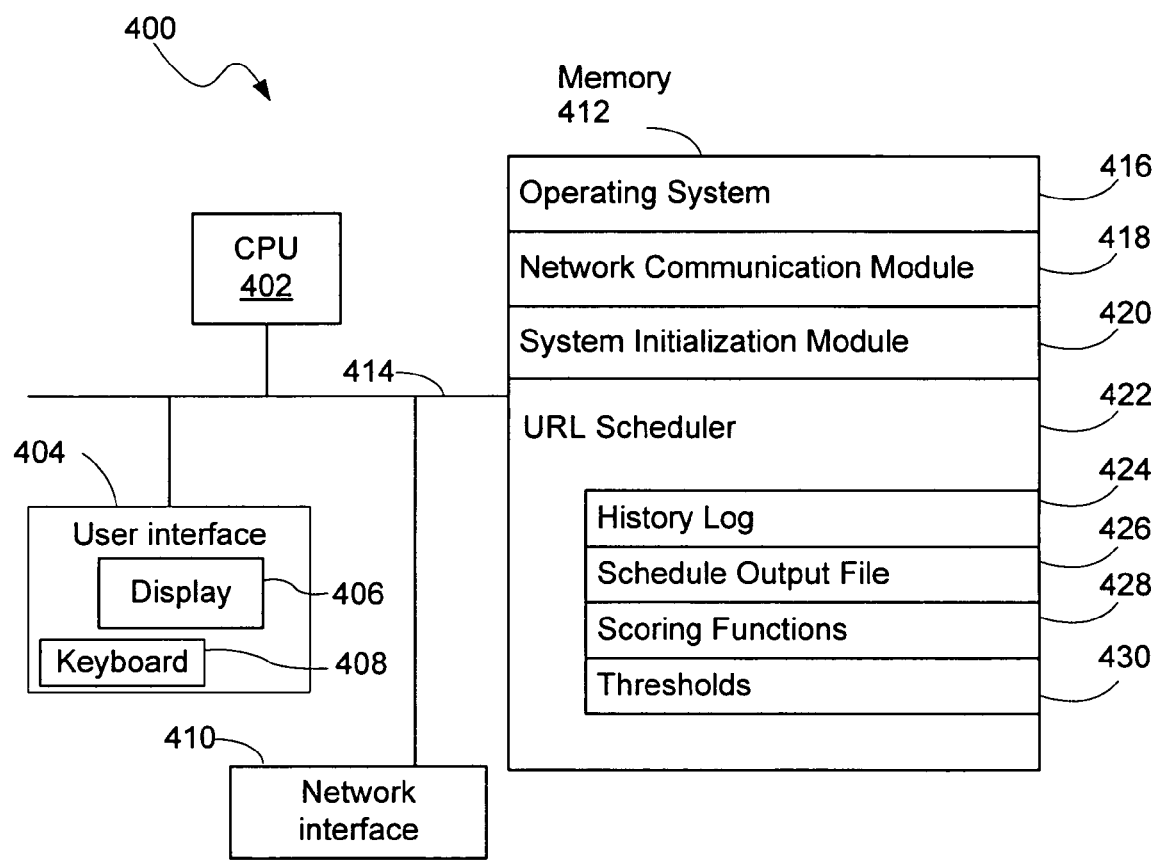
FIG. 4 is a block diagram of a URL scheduler computer system, in accordance with some embodiments of the present invention.

FIG. 4 is a block diagram of a stand alone URL scheduler computer system 400, in accordance with some embodiments of the present invention. The URL scheduler computer system 400 generally includes one or more processing units (CPU's) 402, one or more network or other communications interfaces 410, memory 412, and one or more communication buses 414 for interconnecting these components. The system 400 may optionally include a user interface 404, for instance a display 406 and a keyboard 408. Memory 412 may include high speed random access memory and may also include non-volatile memory, such as one or more magnetic disk storage devices. Memory 412 may include mass storage that is remotely located from the central processing unit(s) 402.

The memory 412 stores an operating system 416 (e.g., Linux or Unix), a network communication module 418, a system initialization module 420 and a URL scheduler module 422. The operating system 416 generally includes procedures for handling various basic system services and for performing hardware dependent tasks. The network communication module 418 is used for connecting the system 400 to the servers hosting the content filters 210 (FIG. 2) and possibly to other servers or computers via one or more communication networks (wired or wireless), such as the Internet, other wide area networks, local area networks, metropolitan area networks, and the like. The system initialization module 420 initializes other modules and data structures stored in memory 414 required for the appropriate operation of the system 400.

The URL scheduler module 422 is used to implement various aspects of the present invention, as described below with respect to FIGS. 5 and 6. The memory 412 also includes scoring functions 428 and data structures (e.g., data structure 100) used by the URL scheduler 422. In some embodiments the data structures include a history log 424, a schedule output file 426, and thresholds 430. In some embodiments, the URL scheduler computer system 400 is a runtime system integrated into a search engine crawler system (e.g., URL scheduler 202 in web crawler system 200) and the scoring functions 428 and thresholds 430 are computed in one or more context filters 210 (FIG. 2). In other embodiments, the URL scheduler computer system 400 is a stand alone system that performs background processing independent of the web crawling system 200.

Figure 5:
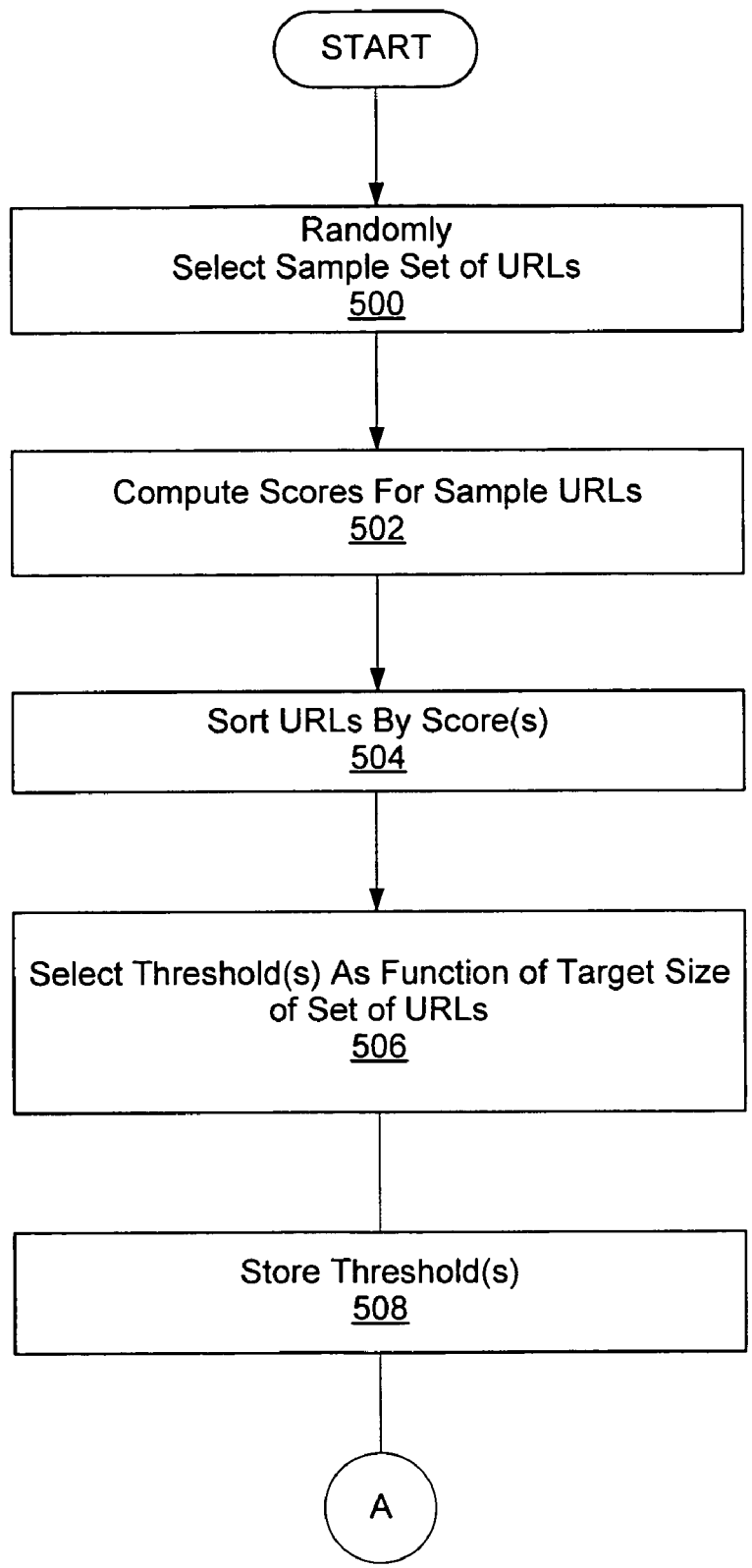
FIG. 5 is a flow diagram of a URL scheduler initialization process, in accordance with some embodiments of the present invention.

FIG. 5 is a flow diagram of a URL scheduler 422 initialization process, in accordance with some embodiments of the present invention. The process begins by selecting 500 (randomly or pseudo-randomly) a sample set of URLs to be scheduled. A set of scores are computed 502 for each URL in the sample. In some embodiments, three types of scores are computed: Keep Score, Crawl Score and Daily Score. In some embodiments, the Keep Score is set equal to the URL page rank and the Daily Score and Crawl Score are computed using Equations (1A) and (2A). Note that more or less scores can be computed, as needed, depending upon the architecture of the system 200.

After the scores are computed 502, the sample set of URLs is sorted 504 in descending (or ascending) order into three sorted lists based on the computed Keep, Crawl and Daily Scores. For the sorted list associated with the Keep Score, a cutoff score (hereinafter also referred to as a "Keep Score threshold") is selected 506 based on a target size of a set of URLs to be included in base layer 102. For the sorted list associated with the Crawl Score, a cut off score (hereinafter also referred to as a "Crawl Score Threshold") is selected 506 based on a target size of a set of URLs from the base layer 102 to be re-crawled (as opposed to being fetched from a repository). For the sorted list associated with the Daily Score, a cut off score (hereinafter also referred to as a "Daily Score Threshold") is selected 506 based on a target size of a set of URLs to be moved from the base layer 102 into the daily crawl layer 104. Any new URLs discovered during a crawl can be placed in the smallest segment in base layer 102. Each of these URLs will have a record in the history log 218 after being crawled for the first time, and will thereafter become part of the normal scheduling process, as described with respect to FIGS. 6 and 7.

To better illustrate the URL scheduler initialization process, let us assume that we have collected a database of URLs, each URL having an associated page rank, change frequency and a time value indicating a period of time that has transpired since the URL was last crawled. The URLs and associated information can be represented as shown in Table I below. Note that this example has been simplified by using integers to represent the URL FP and page rank. In practice, the crawling system 200 would process several billion URLs and the URL FPs and page ranks could be any N-bit integer or other value.

TABLE I

| URL Fingerprint | Page Rank | Change Frequency (Changes/Day) | Time Since Last Crawl (Days) |
|---|---|---|---|
| 1 | 8 | 2 | 3 |
| 2 | 3 | 1 | 2 |
| 3 | 1 | 1 | 1 |
| 4 | 4 | 2 | 1 |
| 5 | 10 | 3 | 4 |
| 6 | 9 | 2 | 7 |
| 7 | 7 | 1 | 3 |
| 8 | 2 | 3 | 4 |
| 9 | 5 | 1 | 15 |
| 10 | 6 | 2 | 3 |

Table I includes a randomly selected sample set of URLs resulting from the performance of step 500 in FIG. 5. In some embodiments, the number of URLs in the sample set is at least one million (e.g., in one embodiment the number of URLs in the sample set is about ten million). In some other embodiments, the number of URLs in the sample set is at least 50,000. A Keep Score, Crawl Score and Daily Score are computed 502 from the sample set of URLs, then sorted 504 by Score into three sorted lists of URLs, as shown in Table II below. The sorted lists include a Keep List, a Crawl List and a Daily List. Note that in this example the Keep Score is set equal to the Page Rank and the Daily and Crawl Scores are computed using Equations (1B) and (2B).

TABLE II

| Keep List (URL FP, Keep Score) | Crawl List (URL FP, Crawl Score) | Daily List (URL FP, Daily Score) |
|---|---|---|
| 5.10 | 6.1134 | 5.300 |
| 6.9 | 5.1200 | 6.162 |
| 1.8 | 1.384 | 1.128 |
| 7.7 | 9.375 | 10.72 |
| 10.6 | 10.216 | 7.49 |
| 9.5 | 7.147 | 4.32 |
| 4.4 | 8.48 | 9.25 |
| 2.3 | 4.32 | 8.12 |
| 8.2 | 2.18 | 2.9 |
| 3.1 | 3.1 | 3.1 |

After computing the sorted lists for each Score, cut off scores (i.e., threshold values) are selected 506 as a function of URL target size. In this example, the target sizes are arbitrarily selected based on the respective URL capacities of the base layer 102 and daily layer 104 (or real-time layer 106) and the bandwidth of the crawler.

Thus, if the URL capacity of the base layer 102 is 70% of the entire set of known URLs, the Keep Threshold is 3, since 70% of the URLs in the sample set have a Keep Score that exceeds 3, including URLs 5, 6, 1, 7, 10, 9 and 4 (see column 1 of Table II).

If the capacity of the crawler is 50% of known URLs, the Crawl Threshold is 147, since there 50% of the URLs in the sample set have a Crawl Score that exceeds 147, including URLs 6, 5, 1, 9 and 10 (see column 2 of Table II).

If the URL capacity of the daily layer 104 is 20% of known URLs, the Daily Threshold may be set to 128, since 20% of the URLs in the sample set have a Daily Score that exceeds 128, including URLs 5 and 6 (see column 3 of Table II). In practice, where the sample set has thousands or millions of URLs, the differences between Daily Score values between adjacent items in the sorted list will typically be very small. The threshold score may be selected as being equal to lowest Daily Score of the URLs to be included in the selected set of URLs, or the next lowest Daily Score, depending on how the threshold is applied to select URLs for the daily crawl. In particular, if the selection criteria is URLs having a score above the threshold, then the threshold score is the highest score of any URL that is not to be included in the selected set; and if the selection criteria is URLs having a score equal to or above the threshold, then the threshold score is the lowest score of any URL to be included in the selected set. Similar criteria are used for selecting the Keep Threshold and the Crawl Threshold.

After the cut off scores are selected 506, they are stored 508 (e.g., in memory 412) for use by the URL scheduler 422 in performing a scheduling process on the entire data structure 100 of system 200, as described below with reference to FIG. 6. Note that the initialization process described above assumes that the sample set of URLs is a good statistical representation of the entire data structure 100 of URLs, and therefore the selected threshold values will result in an allocation of URLs to the various segments in data structure 100 without exceeding the capacity constraints of those segments or the capacity of the crawler system 200 to download web pages.

Figure 7:
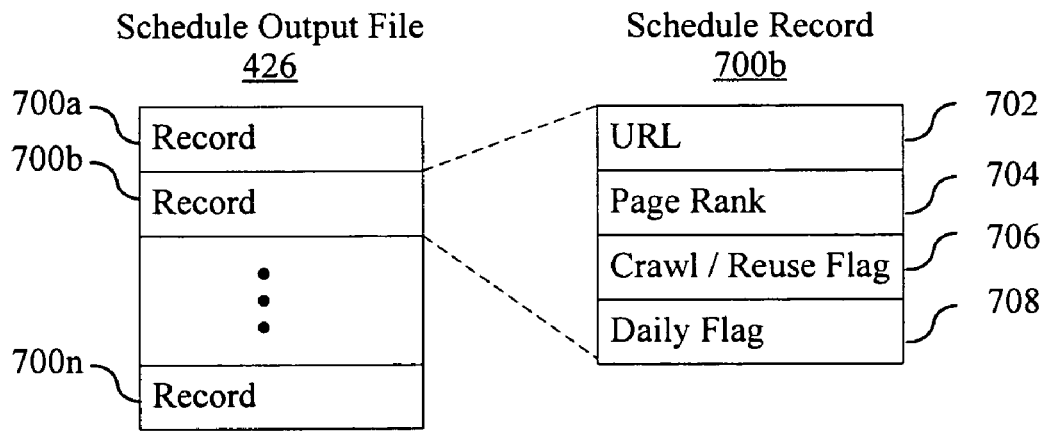
FIG. 7 illustrates an schedule output file generated by the URL scheduler shown in FIG. 4, in accordance with some embodiments of the present invention.
Figure 6:
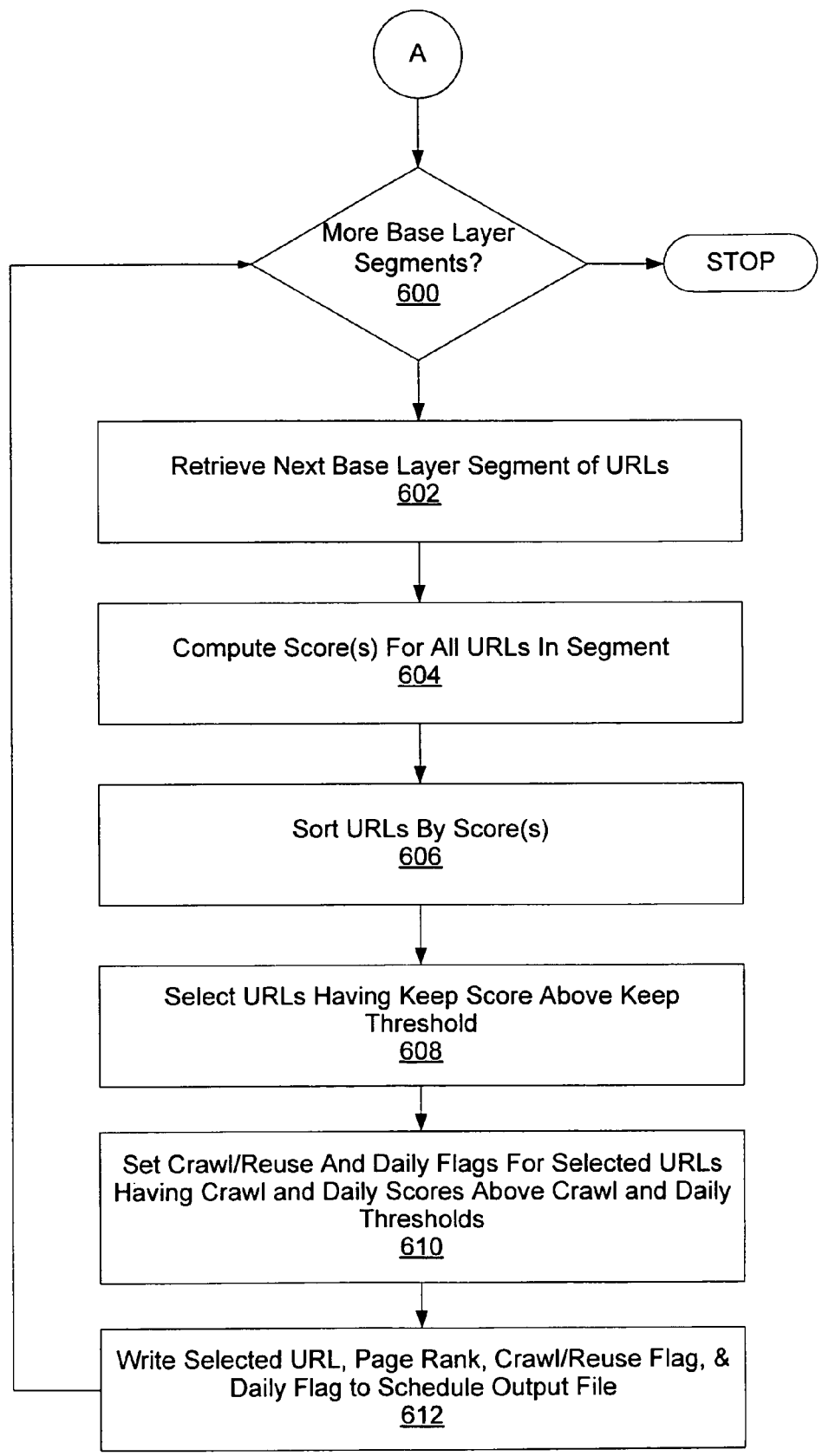
FIG. 6 is flow diagram of a URL scheduler process, in accordance with some embodiments of the present invention.

FIG. 6 is flow diagram of a URL scheduler process, in accordance with some embodiments of the present invention. For each base layer segment 112 (see steps 600, 602), the Keep, Crawl and Daily Scores for the URLs in that segment are computed 604. The URLS are then sorted 606 by Keep Score and the URLs having a Keep Score above the Keep Score threshold are selected 606. A Crawl/Reuse and Daily Flag are then set 610 (or unset) for the selected URLs having Crawl and Daily Scores above the Crawl and Daily Score thresholds. The selected URLs, and the Page Rank, Crawl/Reuse Flag and Daily Flag for the selected URLs are then written 612 to a schedule output file 426, as shown in FIG. 7. This process is repeated (600) for each segment of the base layer.

FIG. 7 illustrates a schedule output file 426, in accordance with some embodiments of the present invention. The schedule output file 426 includes a number of records 700a, . . . , 700n. Each record 700a, . . . , 700n includes a URL 702, a Page Rank 704, a Crawl/Reuse Flag 706 and a Daily Flag 708. The Crawl/Reuse Flag 706 indicates whether the URL should be crawled and downloaded from the network or retrieved from a repository. The Daily Flag 708 indicates whether the URL should be included in the daily layer 104.

In some embodiments, the Crawl/Reuse Flag is a single bit, which can be set to logic "1" to indicate that the URL should be crawled and to logic "0" to indicate that the URL should be fetched from a repository, or vice-versa. Similarly, the Daily Flag can be a single bit that is set to logic "1" to indicate that the URL should be included in the daily layer 104 and to logic "0" to indicate that the URL should not be included in the daily layer 104, or vice-versa. In some embodiments, the Daily Flag can have more than two values. For example, in one embodiment each Daily Flag has one of three values: crawl (i.e., download from Internet), reuse (i.e., use copy from document repository), and crawl if new (i.e., download if the document has been modified since a specified date and/or time).

By example, if the threshold values determined using Table II (as discussed above) are applied against the URLs in Table I, the URLs would be allocated as shown in Table III below. Note that a logic "1" in the Crawl Flag or Daily Flag column indicates that the URL will be crawled and included in the Daily Crawl, respectively.

TABLE III

| URL FP | Keep Score | Crawl Flag | Daily Flag |
|--------|-----------|-----------|-----------|
| 5 | 10 | 1 | 1 |
| 6 | 9 | 1 | 1 |
| 1 | 8 | 1 | 0 |
| 7 | 7 | 0 | 0 |
| 10 | 6 | 1 | 0 |
| 9 | 5 | 1 | 0 |
| 4 | 4 | 0 | 0 |

Thus, referring to Table III, the base layer 104 will include a total of 7 URLS (6, 5, 1, 7, 10, 9, 4). URLs 5, 6, 1, 10 and 9 will be crawled and URLs 7 and 4 will be retrieved from a repository (i.e., reused). URLs 5 and 6 will be moved from the base layer 102 to the daily crawl layer 104 (or real-time layer 106) where they will be crawled more frequently (e.g., once a day), and URLs 1, 7, 10, 9 and 4 will remain in the base layer 102 where they will be crawled less frequently (e.g., every ten days).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of scheduling document indexing, comprising:

at a search engine crawler system having one or more processors and memory storing programs for execution by the one or more processors:

retrieving a number of document identifiers, each document identifier identifying a corresponding document on a network; and for each retrieved document identifier and its corresponding document, determining a query-independent score indicative of a page rank of the corresponding document relative to other documents in a set of documents;

determining a content change frequency of the corresponding document by comparing information stored for successive downloads of the corresponding document;

determining an age of the corresponding document, wherein the age is associated with the time of the last download of the corresponding document by the crawler system;

determining a first score for the document identifier that is a function of the determined query-independent score and the determined content change frequency and the determined age of the corresponding document;

comparing the first score against a threshold value; and conditionally scheduling the document for indexing based on the result of the comparison.

2. The method of claim 1, wherein the scheduling of a document for indexing includes scheduling the document for a particular index segment indicated by a segment identifier associated with the document identifier.

3. The method of claim 1, wherein the content change frequency for a respective document identifier is determined by comparing content checksums stored in a history log for successive downloads of the document corresponding to the document identifier.

4. The method of claim 1, wherein the first score is determined from a content checksum stored in a history log.

5. The method of claim 1, wherein the threshold value is determined using a score computed for each document identifier in a sample set of document identifiers.

6. The method of claim 5, wherein the threshold value is further determined using a target size of a set of documents to be crawled.

7. A scheduler system for a search engine crawler, comprising:

a computer;

a history log containing document identifiers corresponding to documents on a network previously indexed by the search engine crawler, wherein each document identifier has a corresponding document; and a scheduler, executed by the computer, and configured to process each document identifier in a set of the document identifiers in the history log by determining a query-independent score indicative of a page rank of the corresponding document relative to other documents on the network, determining a content change frequency of the document corresponding to the document identifier by comparing information stored for successive downloads of the corresponding document, determining an age of the corresponding document, wherein the age is associated with the time of the last download of the corresponding document by the crawler, determining a first score for the document identifier that is a function of the query-independent score and the determined content change frequency and the determined age of the corresponding document, comparing the first score against a threshold value, and conditionally scheduling the corresponding document for indexing based on the results of the comparison, wherein the history log and scheduler are stored on computer-readable media.

8. The scheduler system of claim 7, wherein the document is scheduled for a particular index segment indicated by a segment identifier in the history log.

9. The scheduler system of claim 7, wherein the scheduler is configured to determine the content change frequency for a respective document identifier by comparing content checksums stored in the history log for successive downloads of the document corresponding to the document identifier.

10. The scheduler system of claim 7, wherein the scheduler is configured to determine the content change frequency from a content checksum stored in a history log.

11. The scheduler system of claim 7, wherein the threshold value is determined using a score computed for each document identifier in a sample set of document identifiers.

12. The scheduler system of claim 11, wherein the threshold value is further determined using a target size of a set of documents to be crawled.

13. A computer-readable storage medium having stored thereon instructions which, when executed by a processor, cause the processor to perform the operations of:

retrieving a number of document identifiers, each document identifier identifying a corresponding document on a network;

for each retrieved document identifier, determining a query-independent score indicative of a page rank of the corresponding document relative to other documents in a set of documents;

determining a content change frequency of the corresponding document identifier by comparing information stored for successive downloads of the corresponding document, determining an age of the corresponding document, wherein the age is associated with the time of the last download of the corresponding document, and determining a first score for the document identifier that is a function of the query-independent score and the determined content change frequency and the determined age of the corresponding document;

comparing the first score against a threshold value; and conditionally scheduling the document for indexing based on the result of the comparison.

14. A computer-readable storage medium of claim 13, wherein the scheduling of a document for indexing includes scheduling the document for a particular index segment indicated by a segment identifier associated with the document identifier.

15. A computer-readable storage medium of claim 13, wherein determining the content change frequency for a respective document identifier includes comparing content checksums stored in a history log for successive downloads of the document corresponding to the document identifier.

16. A computer-readable storage medium of claim 13, wherein determining the content change frequency for a respective document identifier comprises determining the content change frequency from a content checksum stored in a history log.

17. A computer-readable storage medium of claim 13, wherein the threshold value is determined using a score computed for each document identifier in a sample set of document identifiers.

18. A computer-readable storage medium of claim 17, wherein the threshold value is further determined using a target size of a set of documents to be crawled.

* * * * *